United States Patent
Dalsgaard et al.

(10) Patent No.: US 11,864,040 B2
(45) Date of Patent: Jan. 2, 2024

(54) MEASUREMENT MODE DETERMINATION FOR NARROWBAND INTERNET OF THINGS DEVICES

(71) Applicant: NOKIA TECHNOLOGIES OY, Espoo (FI)

(72) Inventors: Lars Dalsgaard, Oulu (FI); Jussi-Pekka Koskinen, Oulu (FI)

(73) Assignee: Nokia Technologies Oy, Espoo (FI)

( * ) Notice: Subject to any disclaimer, the term of this patent is extended or adjusted under 35 U.S.C. 154(b) by 21 days.

(21) Appl. No.: 16/495,097

(22) PCT Filed: Mar. 17, 2017

(86) PCT No.: PCT/EP2017/056447
§ 371 (c)(1),
(2) Date: Sep. 17, 2019

(87) PCT Pub. No.: WO2018/166631
PCT Pub. Date: Sep. 20, 2018

(65) Prior Publication Data
US 2020/0092772 A1    Mar. 19, 2020

(51) Int. Cl.
*H04W 36/00* (2009.01)
*H04W 4/70* (2018.01)

(52) U.S. Cl.
CPC ......... *H04W 36/0094* (2013.01); *H04W 4/70* (2018.02); *H04W 36/0088* (2013.01)

(58) Field of Classification Search
CPC .............. H04W 36/0094; H04W 4/70; H04W 36/0088; H04W 36/0085; H04W 48/08
(Continued)

(56) References Cited

U.S. PATENT DOCUMENTS 8,249,007 B2 * 8/2012 Jading ............... H04W 36/0058
370/329
9,788,332 B2 * 10/2017 Nagata ................ H04W 72/541
(Continued)

FOREIGN PATENT DOCUMENTS

CN       101282559 A     10/2008
CN       102595478 A      7/2012
(Continued)

OTHER PUBLICATIONS

Office Action for European Application No. 17713201.6, dated Mar. 29, 2021, 5 pages.
(Continued)

*Primary Examiner* — Kwang B Yao
*Assistant Examiner* — Syed M Bokhari
(74) *Attorney, Agent, or Firm* — Brake Hughes Bellermann LLP (57) ABSTRACT

Measurement mode determination for narrowband internet of things devices There are provided measures for measurement mode determination for NB-IoT devices. Such measures exemplarily comprise receiving, by a NB-IoT device and from a serving network node (30), configuration information indicative of a measurement mode (e.g., Inband/Guard-band/Standalone) in relation to a neighbor cell, deriving said measurement mode of said neighbor cell from said configuration information, and measuring a reference signal of said neighbor cell based on said measurement mode.

23 Claims, 7 Drawing Sheets

(58) Field of Classification Search
USPC .................................. 370/332, 329, 252, 331
See application file for complete search history.

(56) References Cited

U.S. PATENT DOCUMENTS

| | | | |
|---|---|---|---|
| 2010/0315963 A1* | 12/2010 | Jading | H04L 5/005 370/252 |
| 2016/0044543 A1 | 2/2016 | Nemeth et al. | |
| 2016/0044566 A1* | 2/2016 | Nammi | H04B 1/715 370/331 |
| 2016/0330641 A1* | 11/2016 | Zhang | H04W 72/0453 |
| 2018/0376484 A1* | 12/2018 | Beale | H04W 48/20 |
| 2019/0021021 A1* | 1/2019 | Thangarasa | H04W 24/08 |
| 2019/0223038 A1* | 7/2019 | Yang | H04W 72/046 |

FOREIGN PATENT DOCUMENTS

| | | |
|---|---|---|
| CN | 105474682 A | 4/2016 |
| CN | 106303480 A | 1/2017 |
| WO | 2014121493 A1 | 8/2014 |
| WO | 2017121618 A2 | 7/2017 |
| WO | 2018143864 A1 | 8/2018 |

OTHER PUBLICATIONS

International Search Report and Written Opinion for International Application No. PCT/EP2017/056447, dated Dec. 18, 2017, 20 pages.

3GPP TSG-RAN WG4 Meeting #78-NB-IoT; R4-78-AH-0079; "Discussion on NB-IoT RRM Measurement"; Kista, Sweden; May 3-4, 2016; 4 pages.

3GPP TSG-RAN WG4#77AH NB-IoT; R4-77AH-IoT-0065; "Measurements and Considerations for Cell Reselection for NB-IoT"; Budapest, Hungary; Jan. 20-22, 2016; 3 pages.

3GPP TSG RAN#88; R1-1701896; "On NB-IoT UE Measurements on Anchor Carriers"; Athens, Greece; Feb. 13-17, 2017; 4 pages.

Office Action for Chinese Application No. 201780090486.4, dated Mar. 17, 2021, 8 pages.

Office Action for Chinese Application No. 2017800904864, dated Jan. 19, 2022, 10 pages.

Office Action for Chinese Application No. 201780090486.4, dated Jul. 18, 2022, 12 pages.

Office Action for European Application No. 17713201.6; dated Jan. 3, 2023, 5 pages.

* cited by examiner

MEASUREMENT MODE DETERMINATION FOR NARROWBAND INTERNET OF THINGS DEVICES

CROSS-REFERENCE TO RELATED APPLICATIONS

This application is a national stage entry of International Application No. PCT/EP2017/056447, filed Mar. 17, 2017, entitled "MEASUREMENT MODE DETERMINATION FOR NARROWBAND INTERNET OF THINGS DEVICES" which is hereby incorporated by reference in its entirety.

FIELD

The present invention relates to measurement mode determination for narrowband internet of things (NB-IoT) devices. More specifically, the present invention exemplarily relates to measures (including methods, apparatuses and computer program products) for realizing measurement mode determination for NB-IoT devices.

BACKGROUND

The present specification generally relates to the field of narrowband internet of things technology. NB-IoT is a leading technology in the internet of things (IoT) domain). NB-IoT was defined in 3$^{rd}$ Generation Partnership Project (3GPP) specification Rel-13, but details are still being worked on. A number of compromises were made during the specification time, and detailed studies of more optimal solutions were not effected in any case.

Here, in relation to the present invention, user equipment (UE) measurement requirements have been standardized for NB-IoT. It was discussed whether an NB-IoT synchronization signal (narrowband internet of things secondary synchronization signal (NSSS, also NB-SSS)) could be used by the UE when performing measurements of e.g. narrowband internet of things reference signal received power (NRSRP) and narrowband internet of things reference signal received quality (NRSRQ). The power level of the NSSS was not verified, and thus, the power level was not guaranteed in a similar manner as for the narrowband internet of things reference signal (NRS, also NB-RS). Accordingly, the NSSS could not be used for UE measurements.

Hence, measurements based on the NRS became necessary.

Accordingly, NRSRP and NRSRQ measurement requirements were developed based on a worst case scenario which is inband NB-IoT deployment. In this regard, it is noted that the NB-IoT operation mode may be one of inband mode, guard-band mode, and stand-alone mode. Inband (also inband) means utilizing resource blocks within a normal (Long Term Evolution (LTE)) carrier. Guard-band means utilizing resource blocks within a (LTE) carrier's guardband. Standalone (also stand-alone) means utilizing resource blocks within dedicated spectrum.

Reason for this approach (measurement requirements developed based on worst case scenario "inband") was that UE would only know the NB-IoT operation mode (inband, guard-band and stand-alone) for the (its) serving cell, while neighbor cell operation mode would not be known, unless UE would read the master information block (MIB) of the neighbor cell. Reading MIB from neighbor cells in NB-IoT is not realistic option in practice simply due to delays especially when operating on challenging cell edge conditions. Besides, neighbor cell MIB reading would complicate UE implementation and increase the UE battery consumption.

Figure 6:
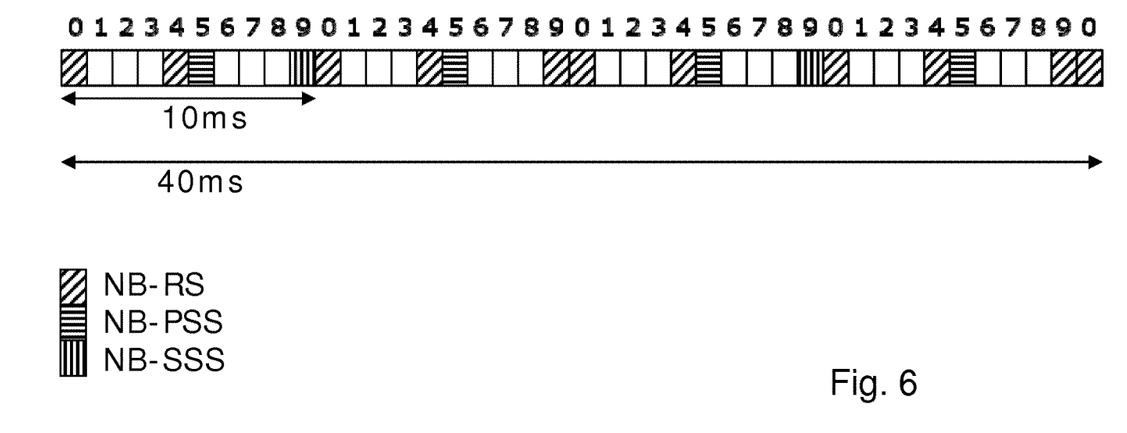
FIG. 6 shows a schematic diagram illustrating downlink subframes in an inband scenario.

FIG. 6 is an illustration of NB-RS, NB-SSS, and narrowband internet of things primary synchronization signal (NPSS, also NB-PSS) in an inband NB-IoT scenario when the UE does not have information on valid downlink (DL) subframes.

Before the UE has knowledge about neighbor cells' valid configuration of the cell-specific valid DL subframes, it may assume that NB-RS is transmitted in subframes #0 and #4 and in subframe #9 if it does not contain NB-SSS.

Figure 7:
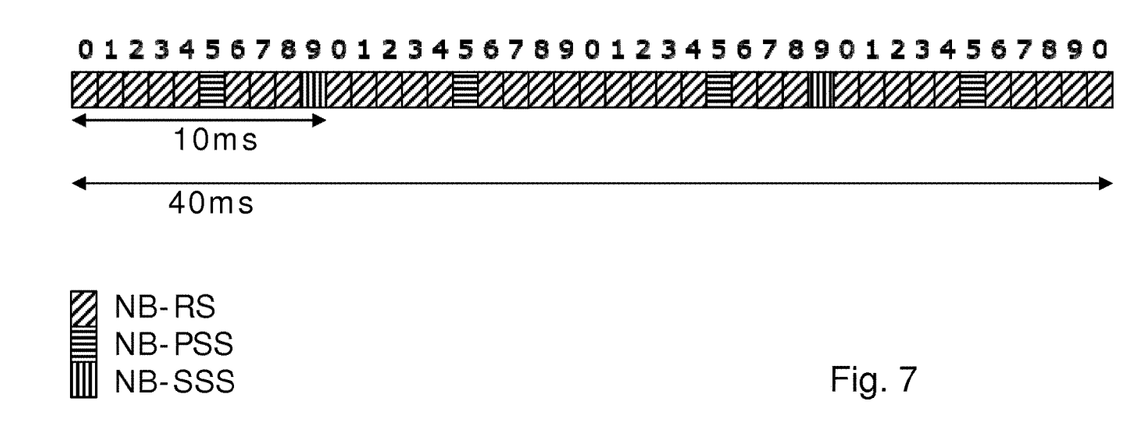
FIG. 7 shows a schematic diagram illustrating downlink subframes in a stand-alone scenario.

FIG. 7 is an illustration of NB-RS, NB-SSS, and NB-PSS in a stand-alone NB-IoT scenario, when the UE has knowledge of valid and invalid DL subframes.

Hence, the problem arises that in the worst case scenario (inband mode is assumed), the UE may use less opportunities to measure the reference signal (NB-RS) than are actually provided, and thus, the NB-IoT system performance is not optimal.

Hence, there is a need to provide for measurement mode determination for NB-IoT devices.

In other words, there is a need to significantly improve the NB-IoT system performance in general, and in particular, to indicate neighbor carrier/cells operation mode to enable knowledge about neighbor cells valid configuration of the cell-specific valid DL subframes.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method comprising receiving configuration information indicative of a measurement mode in relation to a neighbor cell, deriving said measurement mode of said neighbor cell from said configuration information, and measuring a reference signal of said neighbor cell based on said measurement mode.

According to an exemplary aspect of the present invention, there is provided a method comprising determining a measurement mode of a neighbor cell of a served terminal, and transmitting configuration information indicative of said measurement mode of said neighbor cell.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform receiving configuration information indicative of a measurement mode in relation to a neighbor cell, deriving said measurement mode of said neighbor cell from said configuration information, and measuring a reference signal of said neighbor cell based on said measurement mode.

According to an exemplary aspect of the present invention, there is provided an apparatus comprising at least one processor, at least one memory including computer program code, and at least one interface configured for communication with at least another apparatus, the at least one processor, with the at least one memory and the computer program code, being configured to cause the apparatus to perform determining a measurement mode of a neighbor cell of a served terminal, and transmitting configuration information indicative of said measurement mode of said neighbor cell.

According to an exemplary aspect of the present invention, there is provided an apparatus comprising receiving circuitry configured to receive configuration information indicative of a measurement mode in relation to a neighbor cell, deriving circuitry configured to derive said measurement mode of said neighbor cell from said configuration information, and measuring circuitry configured to measure a reference signal of said neighbor cell based on said measurement mode.

According to an exemplary aspect of the present invention, there is provided an apparatus comprising determining circuitry configured to determine a measurement mode of a neighbor cell of a served terminal, and transmitting circuitry configured to transmit configuration information indicative of said measurement mode of said neighbor cell.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient improvement for NB-IoT in terms of improving the UE performance and thereby also the overall performance of the NB-IoT to thereby solve at least part of the problems and drawbacks identified in relation to the prior art.

By way of exemplary embodiments of the present invention, there is provided measurement mode determination for NB-IoT devices. More specifically, by way of exemplary embodiments of the present invention, there are provided measures and mechanisms for realizing measurement mode determination for NB-IoT devices.

Thus, improvement is achieved by methods, apparatuses and computer program products enabling/realizing measurement mode determination for NB-IoT devices.

BRIEF DESCRIPTION OF THE DRAWINGS

In the following, the present invention will be described in greater detail by way of non-limiting examples with reference to the accompanying drawings, in which.

DETAILED DESCRIPTION OF DRAWINGS AND EMBODIMENTS OF THE PRESENT INVENTION

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. In particular, a narrowband internet of things scenario is used as a non-limiting example for the applicability of thus described exemplary embodiments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Here, it is noted that the following present provisions in relation to NB-IoT are considered.

Namely, current UE measurement core requirements and performance are listed in 3GPP TS 36.133. All core and performance requirements are developed based on inband operation. Based on the simulations the following was specified.

For NB-IoT intra frequency measurements under normal coverage, when no discontinuous reception (DRX) is used, in the RRC_CONNECTED state the measurement period for intra frequency measurements is 800 ms. The NRSRP measurement accuracy shall be specified as cited below.

For NB-IoT intra frequency measurements under normal coverage, when DRX is used, in the RRC_CONNECTED state the measurement period for intra frequency measurements is $T_{measure\_intra}$ as shown in the table below, reflecting requirements for intrafrequency measurement.

| DRX cycle length (s) | $T_{measure\_intra}$ (s) (DRX cycles) |
|---|---|
| 0.256 < DRX-cycle ≤ 9.216 | Note1 ([5]) |

Note1: Time depends upon the DRX cycle in use

The NRSRP measurement accuracy shall be specified as cited below.

For NB-IoT intra frequency measurements under enhanced coverage, when no DRX is used, in the RRC_CONNECTED state the measurement period for intra frequency measurements is 1600 ms. The NRSRP measurement accuracy shall be specified as cited below.

For NB-IoT intra frequency measurements under enhanced coverage, when DRX is used, in the RRC_CONNECTED state the measurement period for intra frequency measurements is $T_{measure\_intra}$ as shown in the table below, reflecting requirements for intrafrequency measurement.

| DRX cycle length (s) | $T_{measure\_intra}$ (s) (DRX cycles) |
|---|---|
| 0.256 < DRX-cycle ≤ 9.216 | Note1 ([5]) |

Note1: Time depends upon the DRX cycle in use

The NRSRP measurement accuracy shall be specified as cited below.

The above-referenced measurement accuracy is addressed below, where the accuracy requirements are exemplarily defined.

In particular, for intra-frequency absolute NRSRP accuracy for UE category NB1, the requirements apply to a cell on the same frequency as that of the serving cell for UE category NB1 for stand-alone, guard-band and inband deployments.

Figure 4:
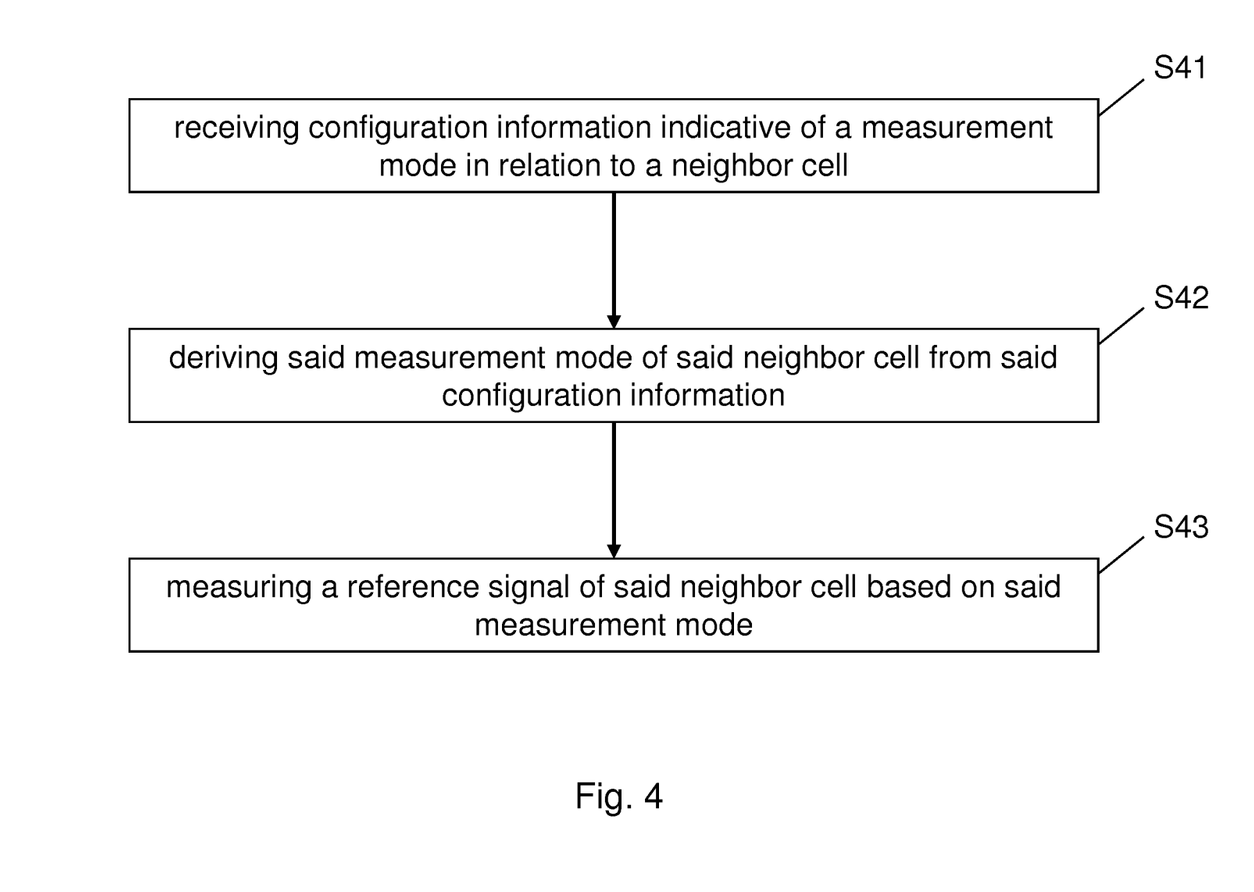
FIG. 4 is a schematic diagram of a procedure according to exemplary embodiments of the present invention.

The accuracy requirements in the table below illustrating NRSRP intra frequency absolute accuracy for UE category NB1 for half-duplex frequency division duplexing (HD-FDD) are valid under the following conditions:
- cell specific reference signals are transmitted either from one or two ports,
- conditions defined in TS 36.101 Clause 7.3 for reference sensitivity are fulfilled,
- NRSRP|dBm according to Annex B.3.X1 for a corresponding Band, and
- at least one DL subframe per radio frame of measured cell is available at the UE for NRSRP measurement assuming measured cell is identified cell.

apparatus may be a terminal 10 such as an IoT UE comprising a receiving circuitry 11, a deriving circuitry 12, and a measuring circuitry 13. The receiving circuitry 11 receives configuration information indicative of a measurement mode in relation to a neighbor cell. The deriving circuitry 12 derives said measurement mode of said neighbor cell from said configuration information. The measuring circuitry 13 measures a reference signal of said neighbor cell based on said measurement mode. FIG. 4 is a schematic diagram of a procedure according to exemplary embodiments of the present invention. The apparatus according to FIG. 1 may perform the method of FIG. 4 but is not limited to this method. The method of FIG. 4 may be performed by the apparatus of FIG. 1 but is not limited to being performed by this apparatus.

As shown in FIG. 4, a procedure according to exemplary embodiments of the present invention comprises an operation of receiving (S41) configuration information indicative of a measurement mode in relation to a neighbor cell, an operation of deriving (S42) said measurement mode of said neighbor cell from said configuration information, and an operation of measuring (S43) a reference signal of said neighbor cell based on said measurement mode.

Figure 1:
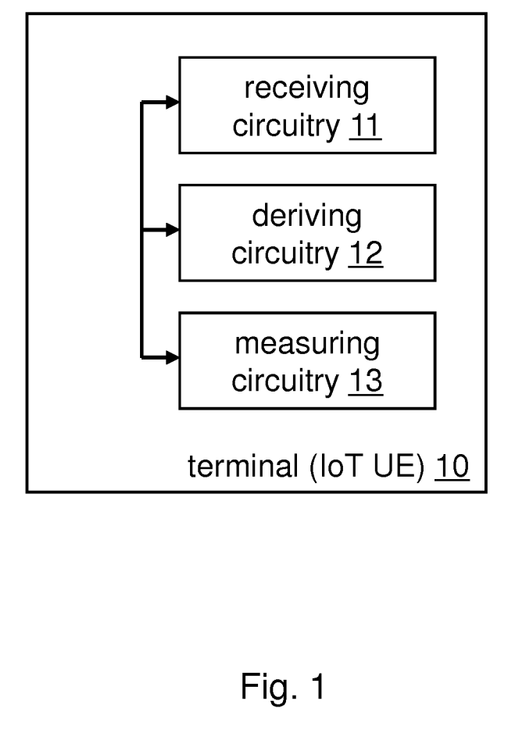
FIG. 1 is a block diagram illustrating an apparatus according to exemplary embodiments of the present invention.
Figure 2:
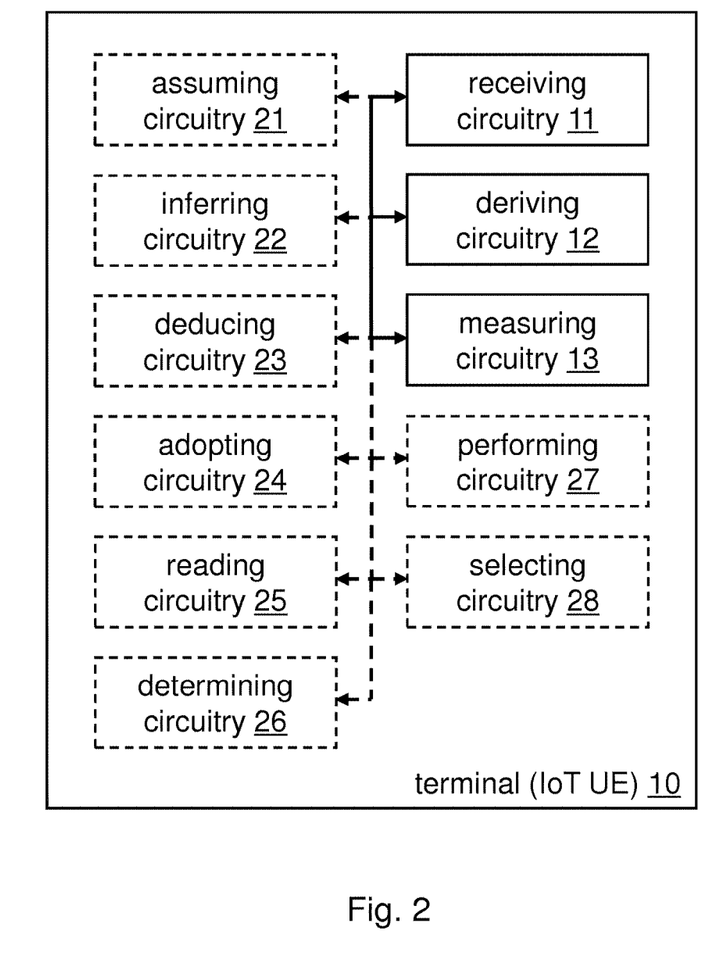
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise assuming circuitry 21, inferring circuitry 22, deducing circuitry 23, adopting circuitry 24, reading circuitry 25, determining circuitry 26, performing circuitry 27, and/or selecting circuitry 28.

| Accuracy | | | | Conditions | | | |
|---|---|---|---|---|---|---|---|
| Normal | Extreme | | | | $I_o$ [Note 1] range | | |
| condition | condition | $\hat{E}s/I_{ot}$ | E-UTRA operating | | Minimum $I_o$ | | Maximum $I_o$ |
| dB | dB | dB | band groups [Note 2] | dBm/15 kHz | dBm/BW$_{Channel}$ | | dBm/BW$_{Channel}$ |
| ±6 | ±[9] | ≥−6 dB | NFDD_G | [−118] | N/A | | [−70] |
| ±[8] | ±[11] | ≥−6 dB | NFDD_G | N/A | [−70] | | [−50] |
| ±10.3 | ±[13.3] | ≥−15 $\hat{E}s/I_{ot}$ ≥ −6 dB | NFDD_G | [−118] | N/A | | [−70] |
| ±[12.3] | ±[15.3] | ≥−15 $\hat{E}s/I_{ot}$ ≥ −6 dB | NFDD_G | N/A | [−70] | | [−50] |

Note 1
$I_o$ is assumed to have constant EPRE across the bandwidth.

Note 2
E-UTRA operating band groups are as defined in Section 3.5.

As is derivable from this table, the accuracy requirements are very relaxed for NB-IoT devices in ≥−15 Ês/Iot≥−6 dB conditions.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) measurement mode determination for NB-IoT devices.

FIG. 1 is a block diagram illustrating an apparatus according to exemplary embodiments of the present invention. The In an embodiment at least some of the functionalities of the apparatus shown in FIGS. 1 (and 2) may be shared between two physically separate devices forming one operational entity. Therefore, the apparatus may be seen to depict the operational entity comprising one or more physically separate devices for executing at least some of the described processes.

According to exemplary embodiments of the present invention, said measurement mode of said neighbor cell is a measurement mode related to one of an inband operation mode of said neighbor cell, a guard-band operation mode of said neighbor cell, and a stand-alone operation mode of said neighbor cell.

According to a variation of the procedure shown in FIG. 4, exemplary details of the measuring operation (S43) are given, which are inherently independent from each other as such.

Such exemplary measuring operation (S43) according to exemplary embodiments of the present invention may (without said measurement mode of said neighbor cell being derived) comprise an operation of assuming transmission of said reference signal in downlink subframes 0 and 4 and, if a predetermined synchronization signal is not transmitted in downlink subframe 9, in said downlink subframe 9.

Further, according to exemplary embodiments of the present invention, said configuration information is indicative of presence and/or absence of restriction of said downlink subframes, and in case of indicated absence of restriction of said downlink subframes, such exemplary measuring operation (S43) according to exemplary embodiments of the present invention may (without said measurement mode of said neighbor cell being derived) comprise an operation of assuming transmission of said reference signal in downlink subframes 0, 1, 2, 3, 4, 6, 7, and 8, and, if said predetermined synchronization signal is not transmitted in said downlink subframe 9, in said downlink subframe 9.

According to further exemplary embodiments of the present invention, said configuration information is indicative of a measurement mode used on said neighbor cell.

According to a variation of the procedure shown in FIG. 4, exemplary details of the deriving operation (S42) are given, which are inherently independent from each other as such.

Namely, according to exemplary embodiments of the present invention, said configuration information is indicative of a measurement mode used on a carrier, and such exemplary deriving operation (S42) according to exemplary embodiments of the present invention may comprise an operation of inferring, as said measurement mode of said neighbor cell, said measurement mode used on said carrier related to said neighbor cell.

Further, according to exemplary embodiments of the present invention, said configuration information is indicative of a measurement mode used on a public land mobile network, and such exemplary deriving operation (S42) according to exemplary embodiments of the present invention may comprise an operation of inferring, as said measurement mode of said neighbor cell, said measurement mode used on said public land mobile network related to said neighbor cell.

Further, according to exemplary embodiments of the present invention, said configuration information is indicative of a measurement mode used on a frequency, and such exemplary deriving operation (S42) according to exemplary embodiments of the present invention may comprise an operation of inferring, as said measurement mode of said neighbor cell, said measurement mode used on said frequency related to said neighbor cell.

Further, according to exemplary embodiments of the present invention, said configuration information includes information indicating a measurement mode used on said neighbor cell.

Further, according to exemplary embodiments of the present invention, said configuration information includes information indicating measurement modes not used on said neighbor cell, and such exemplary deriving operation (S42) according to exemplary embodiments of the present invention may comprise an operation of deducing a measuring mode not indicated as being not used on said neighbor cell as said measurement mode of said neighbor cell.

Further, according to exemplary embodiments of the present invention, said configuration information is indicative of said measurement mode in relation to said neighbor cell with reference to a measurement mode used on a present cell.

According to still further exemplary embodiments of the present invention, said reference is indicative of one of that said measurement mode in relation to said neighbor cell is the same as said measurement mode used on said present cell, and that said measurement mode in relation to said neighbor cell is the different from said measurement mode used on said present cell.

According to a still further variation of the procedure shown in FIG. 4, exemplary details of the deriving operation (S42) are given, which are inherently independent from each other as such.

Namely, according to exemplary embodiments of the present invention, said configuration information is indicative of that the same measurement mode is applied on all cells, and such exemplary deriving operation (S42) according to exemplary embodiments of the present invention may comprise an operation of adopting, as said measurement mode of said neighbor cell, a measurement mode used on a present cell.

Further, according to exemplary embodiments of the present invention, said configuration information is indicative of that said measurement mode used on said present cell is to be adopted as said measurement mode of said neighbor cell, and such exemplary deriving operation (S42) according to exemplary embodiments of the present invention may comprise an operation of adopting, as said measurement mode of said neighbor cell, a measurement mode used on a present cell.

Further, according to exemplary embodiments of the present invention, said configuration information is indicative of that the same measurement mode is not applied on all cells, and such exemplary deriving operation (S42) according to exemplary embodiments of the present invention may comprise an operation of reading said measurement mode of said neighbor cell from a master information block of said neighbor cell.

Further, according to exemplary embodiments of the present invention, said configuration information is indicative of that said measurement mode of said neighbor cell is to be read from a master information block of said neighbor cell, and such exemplary deriving operation (S42) according to exemplary embodiments of the present invention may comprise an operation of reading said measurement mode of said neighbor cell from a master information block of said neighbor cell.

According to a still further variation of the procedure shown in FIG. 4, exemplary details of the measuring operation (S43) are given, which are inherently independent from each other as such.

Such exemplary measuring operation (S43) according to exemplary embodiments of the present invention may comprise an operation of determining downlink subframes for said measuring, and an operation of performing radio measurement of a reference signal in said subframes for said measuring.

Figure 3:
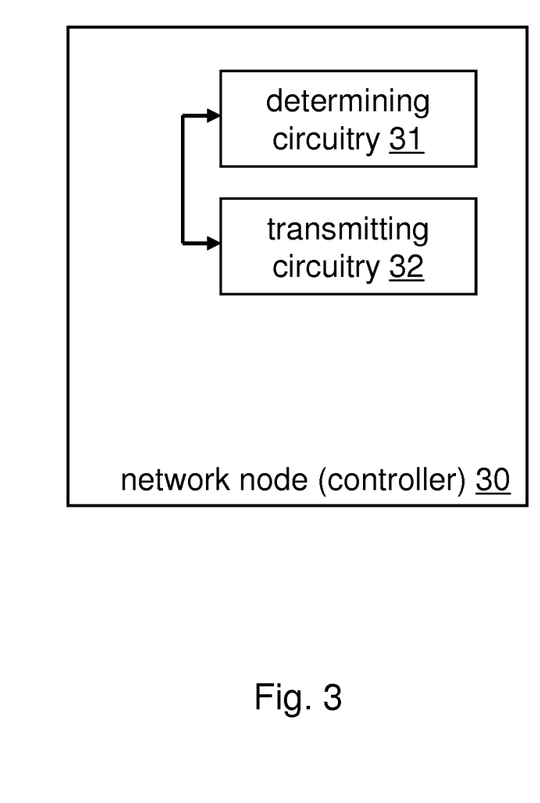
FIG. 3 is a block diagram illustrating an apparatus according to exemplary embodiments of the present invention.
Figure 5:
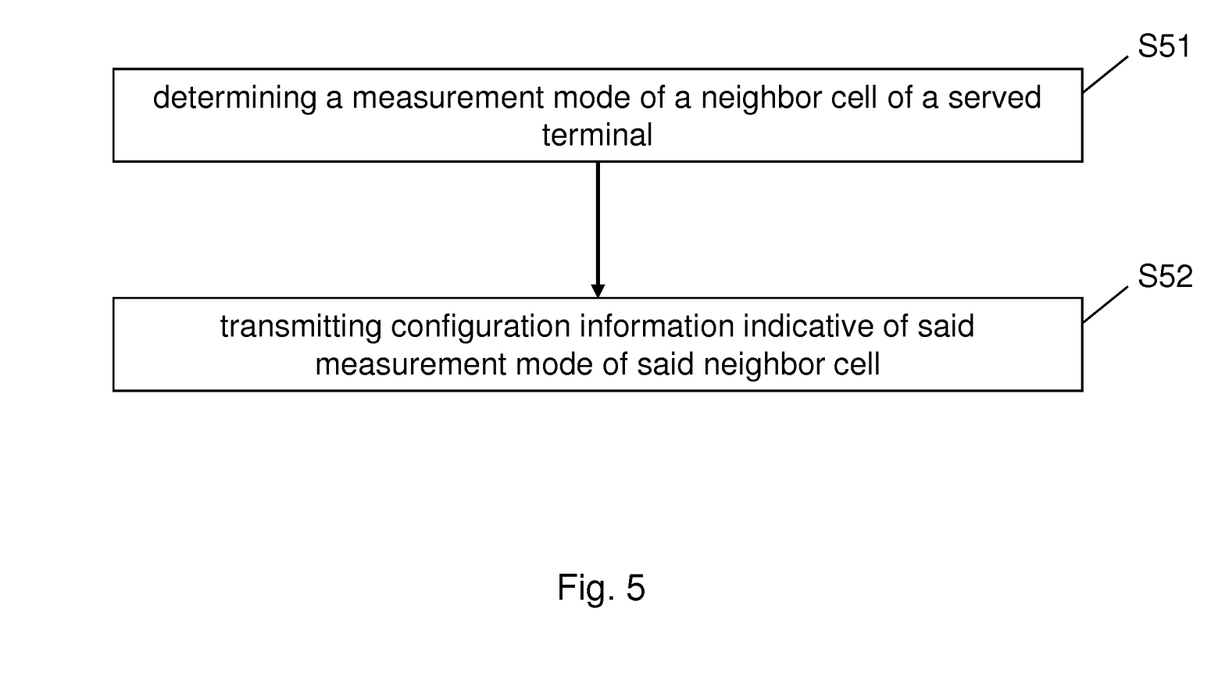
FIG. 5 is a schematic diagram of a procedure according to exemplary embodiments of the present invention.

FIG. 3 is a block diagram illustrating an apparatus according to exemplary embodiments of the present invention. The apparatus may be a network node 30 such as an IoT related network sided controlling entity comprising a determining circuitry 31 and a transmitting circuitry 32. The determining circuitry 31 determines a measurement mode of a neighbor cell of a served terminal. Said transmitting circuitry 32 transmits configuration information indicative of said measurement mode of said neighbor cell. FIG. 5 is a schematic diagram of a procedure according to exemplary embodiments of the present invention. The apparatus according to FIG. 3 may perform the method of FIG. 5 but is not limited to this method. The method of FIG. 5 may be performed by the apparatus of FIG. 3 but is not limited to being performed by this apparatus.

As shown in FIG. 5, a procedure according to exemplary embodiments of the present invention comprises an operation of determining (S51) a measurement mode of a neighbor cell of a served terminal, and an operation of transmitting (S52) configuration information indicative of said measurement mode of said neighbor cell.

In an embodiment at least some of the functionalities of the apparatus shown in FIG. 3 may be shared between two physically separate devices forming one operational entity. Therefore, the apparatus may be seen to depict the operational entity comprising one or more physically separate devices for executing at least some of the described processes.

According to exemplary embodiments of the present invention, said measurement mode of said neighbor cell is a measurement mode related to one of an inband operation mode of said neighbor cell, a guard-band operation mode of said neighbor cell, and a stand-alone operation mode of said neighbor cell.

According to further exemplary embodiments of the present invention, said configuration information is indicative of a measurement mode used on said neighbor cell, and/or said configuration information is indicative of a measurement mode used on a carrier, and/or said configuration information is indicative of a measurement mode used on a public land mobile network, and/or said configuration information is indicative of a measurement mode used on a frequency.

According to still further exemplary embodiments of the present invention, said configuration information includes information indicating a measurement mode used on said neighbor cell, and/or said configuration information includes information indicating measurement modes not used on said neighbor cell.

According to still further exemplary embodiments of the present invention, said configuration information is indicative of said measurement mode in relation to said neighbor cell with reference to a measurement mode used on a present cell serving said terminal.

According to still further exemplary embodiments of the present invention, said reference is indicative of one of that said measurement mode in relation to said neighbor cell is the same as said measurement mode used on said present cell, and that said measurement mode in relation to said neighbor cell is the different from said measurement mode used on said present cell.

According to still further exemplary embodiments of the present invention, said configuration information is indicative of that the same measurement mode is deployed on all cells, and/or said configuration information is indicative of that said measurement mode used on said present cell is to be adopted as said measurement mode of said neighbor cell, and/or said configuration information is indicative of that the same measurement mode is not deployed on all cells, and/or said configuration information is indicative of that said measurement mode of said neighbor cell is to be read from a master information block of said neighbor cell.

Below, exemplary embodiments of the present invention are described in more specific terms.

Namely, according to exemplary embodiments of the present invention, the UE may be informed about the measurement/operation mode of neighbor cells (serving carrier and/or inter-frequency carrier) using dedicated and/or broadcast signaling.

Likely, according to further exemplary embodiments of the present invention, the NB-IoT operation mode of the carrier could apply to all cells on the carrier and therefore the measurement operation mode could be given on a per carrier basis (alternatively on a per cell basis or on a per public land mobile network (PLMN) basis or on a per frequency basis)

One alternative is that the measurement mode would be configured using the measurement configuration in and given per carrier frequency. The indication of the measurement mode of cells a on a carrier would e.g. be in form of a two bit indication which would allow for indication of the three needed measurement modes:

00: inband measurement mode
01: guard-band measurement mode
10: stand-alone measurement mode It is to be understood that the two-bit coding shown above is merely an example, and this aspect of the present invention is not limited to such implementation.

Another alternative is using a relative indication, e.g., indicating that the measurement object (inter-frequency carrier) is to be measured with the same or a different measurement assumption/mode as the current serving carrier.

According to exemplary embodiments of the present invention, different signaling alternatives are classified in an explicit approach and an implicit approach.

According to the explicit approach,
the measurement mode may be signaled separately per cell,
the measurement mode may be signaled separately per carrier,
the measurement mode may be signaled separately per frequency,
the measurement mode may be signaled separately per PLMN,
the used measurement modes may be signaled, and/or
the not used measurement modes may be signaled.

According to the implicit approach,
information may be provided indicating that the same mode is deployed on all the cells (thus, the UE knows the mode from the MIB of the serving cell),
information may be provided indicating that the same mode is not deployed on all the cells (in this case the UE shall read the MIB/operation mode from the neighbor cells),
information may be provided indicating the UE shall read the MIB/operation from the neighbor cells (in this case the operation mode is not the same in all the cells), and/or
information may be provided indicating the there is no need to read the MIB/operation from the neighbor cells (in this case the operation mode is the same in all the cells).

According to exemplary embodiments of the present invention, any combination of the above-mentioned alternatives and variants may be implemented.

The above-mentioned measurement mode may also include/cover information regarding whether the network indicates to the UE that there are or are no restriction on the DL subframes, and/or whether the UE can assume during performing measurements that there are or are no restriction on the DL subframes.

According to exemplary embodiments of the present invention, as outlined above, the indication of the measurement mode of neighbor cells on a carrier is preferably configured to the UE in the measurement configuration. This could be done by a two-bit or one-bit indication.

Based on the measurement mode, the UE measures accordingly, i.e. UE would be able to make full use of the available NRS on the neighbor cell due to the corresponding knowledge of the relevant DL subframes.

According to exemplary embodiments of the present invention, the UE may be required to make use of (all) available NRS based on the new measurement mode indication, and the UE accuracy and performance requirements would be developed based on this.

From system level point of view, this would mean that the UE would be required to make full use of available NRS for measurements and the performance would not be restricted to worst case inband operation.

Hence, implementation if exemplary embodiments of the present invention leads to significantly better UE performance when NB-IoT is non-inband operation mode (i.e. guard-band, standalone) and it would be possible to get significantly better UE accuracy requirements than currently possible.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network entity (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

Figure 8:
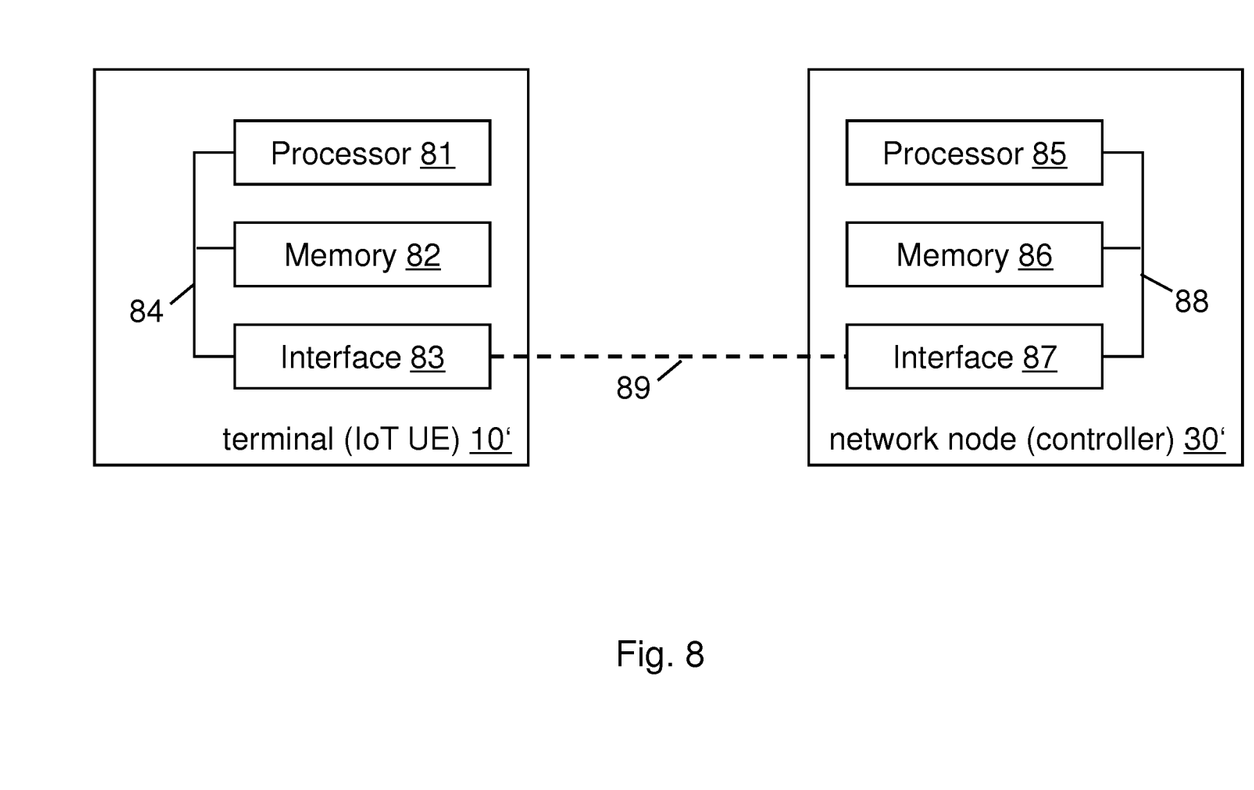
FIG. 8 is a block diagram alternatively illustrating apparatuses according to exemplary embodiments of the present invention.

In FIG. 8, an alternative illustration of apparatuses according to exemplary embodiments of the present invention is depicted. As indicated in FIG. 8, according to exemplary embodiments of the present invention, the apparatus (terminal) 10' (corresponding to the terminal 10) comprises a processor 81, a memory 82 and an interface 83, which are connected by a bus 84 or the like. Further, according to exemplary embodiments of the present invention, the apparatus (network node) 30' (corresponding to the network node 30) comprises a processor 85, a memory 86 and an interface 87, which are connected by a bus 88 or the like, and the apparatuses may be connected via link 89, respectively.

The processor 81/85 and/or the interface 83/87 may also include a modem or the like to facilitate communication over a (hardwire or wireless) link, respectively. The interface 83/87 may include a suitable transceiver coupled to one or more antennas or communication means for (hardwire or wireless) communications with the linked or connected device(s), respectively. The interface 83/87 is generally configured to communicate with at least one other apparatus, i.e. the interface thereof.

The memory 82/86 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the terminal 10 comprises at least one processor 81, at least one memory 82 including computer program code, and at least one interface 83 configured for communication with at least another apparatus. The processor (i.e. the at least one processor 81, with the at least one memory 82 and the computer program code) is configured to perform receiving configuration information indicative of a measurement mode in relation to a neighbor cell (thus the apparatus comprising corresponding means for receiving), to perform deriving said measurement mode of said neighbor cell from said configuration information (thus the apparatus comprising corresponding means for deriving), and to perform measuring a reference signal of said neighbor cell based on said measurement mode (thus the apparatus comprising corresponding means for measuring).

According to further exemplary embodiments of the present invention, an apparatus representing the network node 30 comprises at least one processor 85, at least one memory 86 including computer program code, and at least one interface 87 configured for communication with at least another apparatus. The processor (i.e. the at least one processor 85, with the at least one memory 86 and the computer program code) is configured to perform determining a measurement mode of a neighbor cell of a served terminal (thus the apparatus comprising corresponding means for determining), and to perform transmitting configuration information indicative of said measurement mode of said neighbor cell (thus the apparatus comprising corresponding means for transmitting).

For further details regarding the operability/functionality of the individual apparatuses, reference is made to the above description in connection with any one of FIGS. 1 to 7, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for measurement mode determination for NB-IoT devices. Such measures exemplarily comprise receiving configuration information indicative of a measurement mode in relation to a neighbor cell, deriving said measurement mode of said neighbor cell from said configuration information, and measuring a reference signal of said neighbor cell based on said measurement mode.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP 3rd Generation Partnership Project
DL downlink
DRX discontinuous reception
HD-FDD half-duplex frequency division duplexing
IoT internet of things
LTE Long Term Evolution
MIB master information block
NB-IoT narrowband internet of things
NPSS narrowband internet of things primary synchronization signal, NB-PSS
NRS narrowband internet of things reference signal, NB-RS
NRSRP narrowband internet of things reference signal received power
NRSRQ narrowband internet of things reference signal received quality
NSSS narrowband internet of things secondary synchronization signal, NB-SSS
PLMN public land mobile network
UE user equipment

The invention claimed is:
1. A method comprising:
receiving configuration information indicative of a measurement mode in relation to a neighbor cell,
deriving said measurement mode of said neighbor cell from said configuration information, and
measuring a reference signal of said neighbor cell based on said measurement mode, including determining downlink subframes for said measuring according to whether the measurement mode is related to an inband operation or whether the measurement mode is related to any of a guard-band operation mode of the neighbor cell and a stand-alone operation mode of the neighbor cell, and performing radio measurement of a reference signal in said subframes for said measuring;

wherein said configuration information is indicative of presence and/or absence of restriction of said downlink subframes;

wherein in relation to said measuring, without said measurement mode of said neighbor cell being derived, said method further comprises assuming transmission of said reference signal in downlink subframes 0 and 4 and, if a predetermined synchronization signal is not transmitted in downlink subframe 9, in said downlink subframe 9, and wherein in case of indicated absence of restriction of said downlink subframes, without said measurement mode of said neighbor cell being derived, said method further comprises assuming transmission of said reference signal in downlink subframes 0, 1, 2, 3, 4, 6, 7, and 8, and, if said predetermined synchronization signal is not transmitted in said downlink subframe 9, in said downlink subframe 9.

2. The method according to claim 1, wherein:

said configuration information is indicative of a measurement mode used on said neighbor cell, or said configuration information is indicative of a measurement mode used on a carrier, and in relation to said deriving, said method further comprises inferring, as said measurement mode of said neighbor cell, said measurement mode used on said carrier related to said neighbor cell, or said configuration information is indicative of a measurement mode used on a public land mobile network, and in relation to said deriving, said method further comprises inferring, as said measurement mode of said neighbor cell, said measurement mode used on said public land mobile network related to said neighbor cell, or said configuration information is indicative of a measurement mode used on a frequency, and in relation to said deriving, said method further comprises inferring, as said measurement mode of said neighbor cell, said measurement mode used on said frequency related to said neighbor cell.

3. The method according to claim 1, wherein:

said configuration information includes information indicating a measurement mode used on said neighbor cell, or said configuration information includes information indicating measurement modes not used on said neighbor cell, and in relation to said deriving, said method further comprises deducing a measuring mode not indicated as being not used on said neighbor cell as said measurement mode of said neighbor cell.

4. The method according to claim 1, wherein:

said configuration information is indicative of said measurement mode in relation to said neighbor cell with reference to a measurement mode used on a present cell.

5. The method according to claim 4, wherein:

said reference is indicative of one of that said measurement mode in relation to said neighbor cell is the same as said measurement mode used on said present cell, and that said measurement mode in relation to said neighbor cell is different from said measurement mode used on said present cell.

6. The method according to claim 1, wherein:

said configuration information is indicative of that the same measurement mode is applied on all cells, wherein, in relation to said deriving, the method further comprises adopting, as said measurement mode of said neighbor cell, a measurement mode used on a present cell, or said configuration information is indicative of that said measurement mode used on said present cell is to be adopted as said measurement mode of said neighbor cell, wherein, in relation to said deriving, the method further comprises adopting, as said measurement mode of said neighbor cell, a measurement mode used on a present cell, or said configuration information is indicative of that the same measurement mode is not applied on all cells, wherein, in relation to said deriving, the method further comprises reading said measurement mode of said neighbor cell from a master information block of said neighbor cell, or said configuration information is indicative of that said measurement mode of said neighbor cell is to be read from a master information block of said neighbor cell, wherein, in relation to said deriving, the method further comprises reading said measurement mode of said neighbor cell from a master information block of said neighbor cell.

7. The method according to claim 1, wherein:

in case said measurement mode of said neighbor cell is a measurement mode related to an inband operation mode of said neighbor cell, in relation to said determining, said method further comprises selecting at least downlink subframes 0, 4 and 9 as said subframes for said measuring, and in case said measurement mode of said neighbor cell is a measurement mode related to any of a guard-band operation mode of said neighbor cell and a stand-alone operation mode of said neighbor cell, in relation to said determining, said method further comprises selecting at least downlink subframes 0, 1, 2, 3, 4, 6, 7, 8, and 9 as said subframes for said measuring.

8. The method according to claim 1, wherein said configuration information is indicative of presence and/or absence of restriction of prespecified downlink subframes.

9. A method comprising:

determining a measurement mode of a neighbor cell of a served terminal, and transmitting configuration information indicative of said measurement mode of said neighbor cell, wherein downlink subframes for measuring by said served terminal are determined according to whether the measurement mode is related to an inband operation or whether the measurement mode is related to any of a guard-band operation mode of the neighbor cell and a stand-alone operation mode of the neighbor cell;

wherein said configuration information is indicative of presence and/or absence of restriction of said downlink subframes;

wherein in relation to said measuring, without said measurement mode of said neighbor cell being derived, said method further comprises assuming transmission of said reference signal in downlink subframes 0 and 4 and, if a predetermined synchronization signal is not transmitted in downlink subframe 9, in said downlink subframe 9, and wherein in case of indicated absence of restriction of said downlink subframes, without said measurement mode of said neighbor cell being derived, said method further comprises assuming transmission of said reference signal in downlink subframes 0, 1, 2, 3, 4, 6, 7, and 8, and, if said predetermined synchronization signal is not transmitted in said downlink subframe 9, in said downlink subframe 9.

10. The method according to claim 9, wherein:
said configuration information is indicative of a measurement mode used on said neighbor cell, or
said configuration information is indicative of a measurement mode used on a carrier, or
said configuration information is indicative of a measurement mode used on a public land mobile network, or
said configuration information is indicative of a measurement mode used on a frequency.

11. The method according to claim 9, wherein:
said configuration information includes information indicating a measurement mode used on said neighbor cell, or
said configuration information includes information indicating measurement modes not used on said neighbor cell.

12. The method according to claim 9, wherein:
said configuration information is indicative of said measurement mode in relation to said neighbor cell with reference to a measurement mode used on a present cell serving said terminal.

13. The method according to claim 12, wherein:
said reference is indicative of one of that said measurement mode in relation to said neighbor cell is the same as said measurement mode used on said present cell, and that said measurement mode in relation to said neighbor cell is different from said measurement mode used on said present cell.

14. The method according to claim 9, wherein:
said configuration information is indicative of that the same measurement mode is deployed on all cells, or
said configuration information is indicative of that said measurement mode used on said present cell is to be adopted as said measurement mode of said neighbor cell, or
said configuration information is indicative of that the same measurement mode is not deployed on all cells, or
said configuration information is indicative of that said measurement mode of said neighbor cell is to be read from a master information block of said neighbor cell.

15. An apparatus comprising:
at least one processor,
at least one memory including computer program code, and
at least one interface configured for communication with at least another apparatus,
the at least one processor, with the at least one memory and the computer program code, being configured to cause the apparatus to perform:
receiving configuration information indicative of a measurement mode in relation to a neighbor cell,
deriving said measurement mode of said neighbor cell from said configuration information, and
measuring a reference signal of said neighbor cell based on said measurement mode, including determining downlink subframes for said measuring according to whether the measurement mode is related to an inband operation or whether the measurement mode is related to any of a guard-band operation mode of the neighbor cell and a stand-alone operation mode of the neighbor cell, and performing radio measurement of a reference signal in said subframes for said measuring;
wherein said configuration information is indicative of presence and/or absence of restriction of said downlink subframes;
wherein in relation to said measuring, without said measurement mode of said neighbor cell being derived, said method further comprises assuming transmission of said reference signal in downlink subframes 0 and 4 and, if a predetermined synchronization signal is not transmitted in downlink subframe 9, in said downlink subframe 9, and
wherein in case of indicated absence of restriction of said downlink subframes, without said measurement mode of said neighbor cell being derived, said method further comprises assuming transmission of said reference signal in downlink subframes 0, 1, 2, 3, 4, 6, 7, and 8, and, if said predetermined synchronization signal is not transmitted in said downlink subframe 9, in said downlink subframe 9.

16. The apparatus according to claim 15, wherein:
said configuration information is indicative of a measurement mode used on said neighbor cell, or
said configuration information is indicative of a measurement mode used on a carrier, and in relation to said deriving, the at least one processor, with the at least one memory and the computer program code, being configured to cause the apparatus to perform inferring, as said measurement mode of said neighbor cell, said measurement mode used on said carrier related to said neighbor cell, or
said configuration information is indicative of a measurement mode used on a public land mobile network, and in relation to said deriving, the at least one processor, with the at least one memory and the computer program code, being configured to cause the apparatus to perform inferring, as said measurement mode of said neighbor cell, said measurement mode used on said public land mobile network related to said neighbor cell, or
said configuration information is indicative of a measurement mode used on a frequency, and in relation to said deriving, the at least one processor, with the at least one memory and the computer program code, being configured to cause the apparatus to perform inferring, as said measurement mode of said neighbor cell, said measurement mode used on said frequency related to said neighbor cell.

17. The apparatus according to claim 15, wherein:
said configuration information includes information indicating a measurement mode used on said neighbor cell, or
said configuration information includes information indicating measurement modes not used on said neighbor cell, and in relation to said deriving, the at least one processor, with the at least one memory and the computer program code, being configured to cause the apparatus to perform deducing a measuring mode not indicated as being not used on said neighbor cell as said measurement mode of said neighbor cell.

18. The apparatus according to claim 15, wherein:
said configuration information is indicative of said measurement mode in relation to said neighbor cell with reference to a measurement mode used on a present cell.

19. The apparatus according to claim 18, wherein:
said reference is indicative of one of that said measurement mode in relation to said neighbor cell is the same as said measurement mode used on said present cell, and that said measurement mode in relation to said neighbor cell is different from said measurement mode used on said present cell.

20. The apparatus according to claim 15, wherein:
said configuration information is indicative of that the same measurement mode is applied on all cells, wherein, in relation to said deriving, the at least one processor, with the at least one memory and the computer program code, being configured to cause the apparatus to perform adopting, as said measurement mode of said neighbor cell, a measurement mode used on a present cell, or
said configuration information is indicative of that said measurement mode used on said present cell is to be adopted as said measurement mode of said neighbor cell, wherein, in relation to said deriving, the at least one processor, with the at least one memory and the computer program code, being configured to cause the apparatus to perform adopting, as said measurement mode of said neighbor cell, a measurement mode used on a present cell, or
said configuration information is indicative of that the same measurement mode is not applied on all cells, wherein, in relation to said deriving, the at least one processor, with the at least one memory and the computer program code, being configured to cause the apparatus to perform reading said measurement mode of said neighbor cell from a master information block of said neighbor cell, or
said configuration information is indicative of that said measurement mode of said neighbor cell is to be read from a master information block of said neighbor cell, wherein, in relation to said deriving, the at least one processor, with the at least one memory and the computer program code, being configured to cause the apparatus to perform reading said measurement mode of said neighbor cell from a master information block of said neighbor cell.

21. The apparatus according to claim 20, wherein:
in case said measurement mode of said neighbor cell is a measurement mode related to an inband operation mode of said neighbor cell, in relation to said determining, the at least one processor, with the at least one memory and the computer program code, being configured to cause the apparatus to perform selecting at least downlink subframes 0, 4 and 9 as said subframes for said measuring, and
in case said measurement mode of said neighbor cell is a measurement mode related to any of a guard-band operation mode of said neighbor cell and a stand-alone operation mode of said neighbor cell, in relation to said determining, the at least one processor, with the at least one memory and the computer program code, being configured to cause the apparatus to perform selecting at least downlink subframes 0, 1, 2, 3, 4, 6, 7, 8, and 9 as said subframes for said measuring.

22. An apparatus comprising:
at least one processor,
at least one memory including computer program code, and
at least one interface configured for communication with at least another apparatus,
the at least one processor, with the at least one memory and the computer program code, being configured to cause the apparatus to perform:
determining a measurement mode of a neighbor cell of a served terminal, and
transmitting configuration information indicative of said measurement mode of said neighbor cell,
wherein downlink subframes for measuring by said served terminal are determined according to whether the measurement mode is related to an inband operation or whether the measurement mode is related to any of a guard-band operation mode of the neighbor cell and a stand-alone operation mode of the neighbor cell;
wherein said configuration information is indicative of presence and/or absence of restriction of said downlink subframes;
wherein in relation to said measuring, without said measurement mode of said neighbor cell being derived, said method further comprises assuming transmission of said reference signal in downlink subframes 0 and 4 and, if a predetermined synchronization signal is not transmitted in downlink subframe 9, in said downlink subframe 9, and
wherein in case of indicated absence of restriction of said downlink subframes, without said measurement mode of said neighbor cell being derived, said method further comprises assuming transmission of said reference signal in downlink subframes 0, 1, 2, 3, 4, 6, 7, and 8, and, if said predetermined synchronization signal is not transmitted in said downlink subframe 9, in said downlink subframe 9.

23. The apparatus according to claim 22, wherein:
said configuration information is indicative of a measurement mode used on said neighbor cell, or
said configuration information is indicative of a measurement mode used on a carrier, or
said configuration information is indicative of a measurement mode used on a public land mobile network, or
said configuration information is indicative of a measurement mode used on a frequency.

* * * * *